US012510189B1

(12) United States Patent
Gretz

(10) Patent No.: US 12,510,189 B1
(45) Date of Patent: Dec. 30, 2025

(54) KIT FOR LOW VOLTAGE CABLE PASS-THRU PLATE

(71) Applicant: ARLINGTON INDUSTRIES, INC., Scranton, PA (US)

(72) Inventor: Thomas J. Gretz, Delray Beach, FL (US)

(73) Assignee: Arlingon Industries, Inc., Scranton, PA (US)

( * ) Notice: Subject to any disclaimer, the term of this patent is extended or adjusted under 35 U.S.C. 154(b) by 52 days.

(21) Appl. No.: 18/731,263

(22) Filed: Jun. 1, 2024

Related U.S. Application Data

(60) Provisional application No. 63/470,863, filed on Jun. 3, 2023.

(51) Int. Cl.
F16L 5/10 (2006.01)
(52) U.S. Cl.
CPC ..................... F16L 5/10 (2013.01)
(58) Field of Classification Search
CPC ..................................................... F16L 5/10
USPC ....... 248/56; 174/67, 480, 66, 135; 220/242, 220/241
See application file for complete search history.

(56) References Cited

U.S. PATENT DOCUMENTS

| | | | | |
|---|---|---|---|---|
| 3,729,572 A * | 4/1973 | Helin | ................. | H02G 3/14 220/3.6 |
| 5,261,633 A * | 11/1993 | Mastro | ................. | F16L 3/18 248/68.1 |
| 5,967,327 A * | 10/1999 | Jones | ................. | B65D 81/075 206/466 |
| 6,308,921 B1 * | 10/2001 | Borzucki | ................. | F16L 3/237 248/68.1 |
| 7,112,744 B1 * | 9/2006 | DeCosta | ................. | H02G 3/14 174/67 |
| 7,554,036 B1 * | 6/2009 | DeCosta | ................. | H02G 3/14 174/67 |
| 8,350,153 B1 * | 1/2013 | DeCosta | ................. | H02G 3/14 174/67 |
| 10,221,994 B2 * | 3/2019 | Baiera | ................. | F16L 3/237 |
| 2017/0284567 A1 * | 10/2017 | Gaw | ................. | F16L 3/16 |

* cited by examiner

Primary Examiner — Anita M King

(57) ABSTRACT

A kit for installing a low voltage pass-through plate at a wall opening in order to provide an opening for passage of low voltage cables through a wall surface. The kit includes at least two plate sections and two or more reducer sections for creating a desired opening through the joined plate sections. The kit enables the installer to assemble a pass-thru plate with the proper opening to meet the requirements at the job site.

3 Claims, 10 Drawing Sheets

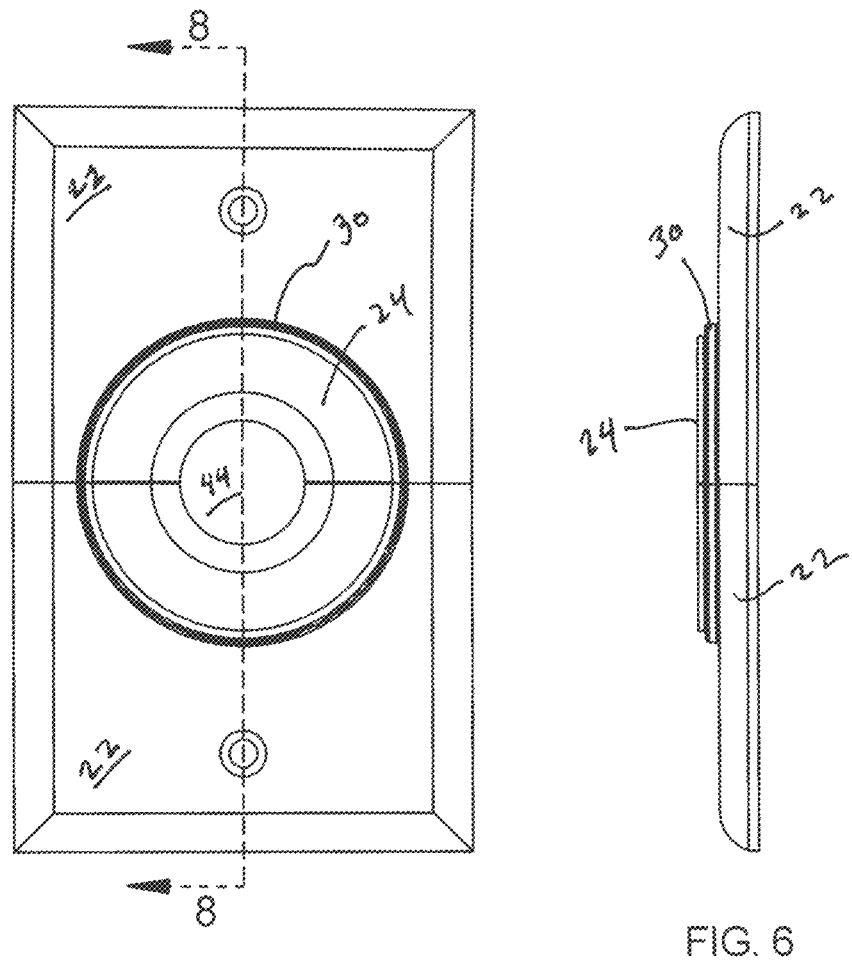
FIG. 5
FIG. 6
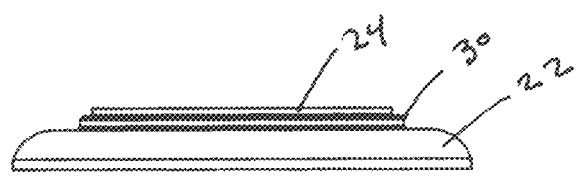
FIG. 7

KIT FOR LOW VOLTAGE CABLE PASS-THRU PLATE

This application claims the priority of Provisional U.S. Patent Application Ser. No. 63/470,863 filed Jun. 3, 2023.

FIELD OF THE INVENTION

The present invention relates to pass-through devices for low voltage cables, and, more particularly, this invention relates to a kit for a low voltage pass-through plate for mounting to a low voltage bracket or to an electrical box to provide an opening for passage of low voltage cables through a wall surface.

BACKGROUND OF THE INVENTION

Conventional wall plates for low voltage cables typically include a plate with an opening for passage therethrough of low voltage cables or bundles of cables. Alternatively, some wall plates include multiple sections that are typically joined together to form a cable access opening for the passage of cables or bundles of cables. The multi-section wall plates allowed for the wall sections to be split and then reconnected to allow passage of cables or cable bundles of various sizes through the cable access opening.

However, the cable access openings in both unitary plates and multi-section plates are of a set size, which limits the ability of an installer at the job site to accommodate cable bundles of various sizes. Thus an installer must carry wall plates with various size cable openings to the job site, and forces manufacturers to stock multiple wall plates with various size cable access openings.

BRIEF SUMMARY OF THE INVENTION

The invention is a kit for installing a low voltage pass-through plate at a wall opening in order to provide an opening for passage of low voltage cables through a wall surface. The kit includes at least two plate sections and two or more reducer sections for creating a desired opening through the joined plate sections. The kit enables the installer to assemble a pass-thru plate with the proper opening to meet the requirements at the job site.

BRIEF DESCRIPTION OF THE DRAWINGS

FIG. 5 is a top plan view of the single-gang LV pass-thru plate assembly.

FIG. 6 is a side view of the single-gang LV pass-thru plate assembly.

FIG. 7 is an end view of the single-gang LV pass-thru plate assembly.

DETAILED DESCRIPTION

Figure 1:
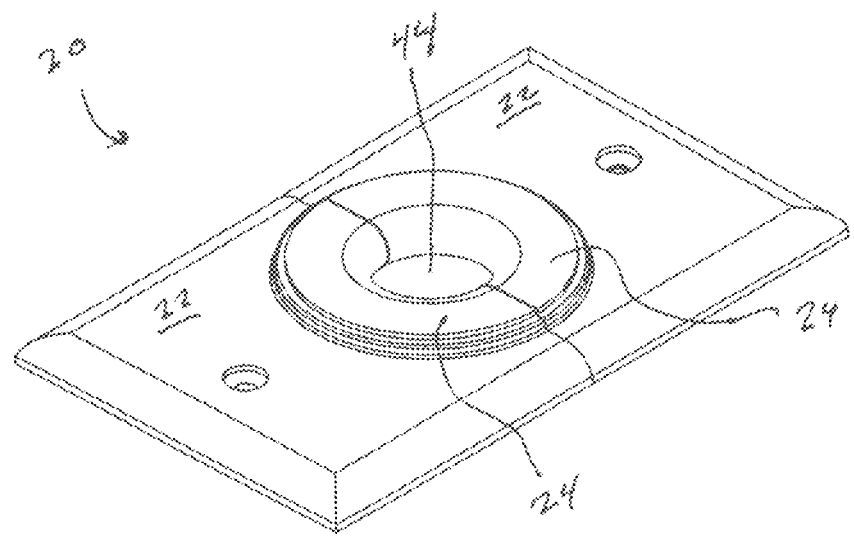
FIG. 1 is a top perspective view of a low voltage (LV) single-gang pass-thru plate according to the present invention.
Figure 2:
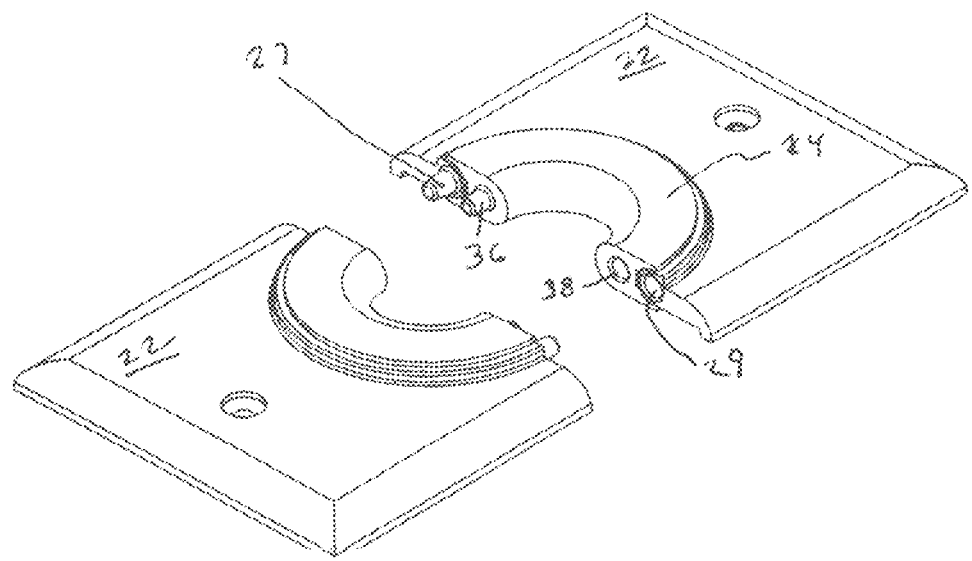
FIG. 2 is a top perspective view of two single-gang plate and reducer assemblies in alignment to form an LV pass-thru plate according to the present invention.
Figure 3:
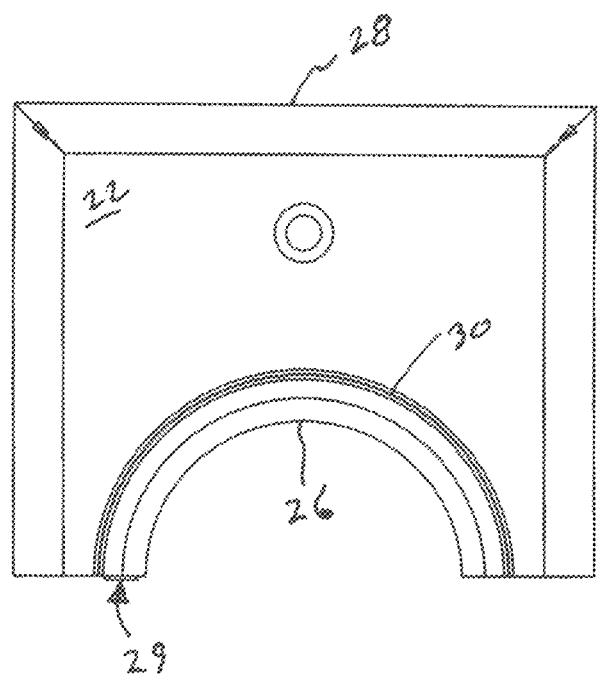
FIG. 3 is a plan view of a first plate section of the low voltage (LV) single-gang pass-thru plate.
Figure 4:
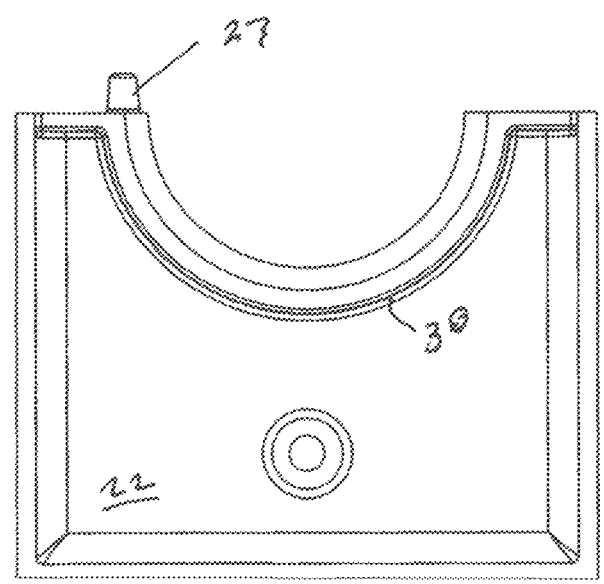
FIG. 4 is a plan view of a second plate section of the low voltage (LV) single-gang pass-thru plate.

With reference to FIGS. 1-2 there is shown a low voltage (LV) pass-thru plate 20 according to the present invention. LV pass-thru plate 20 is an assembly of two plate sections 22 and two reducers 24.

Figure 12:
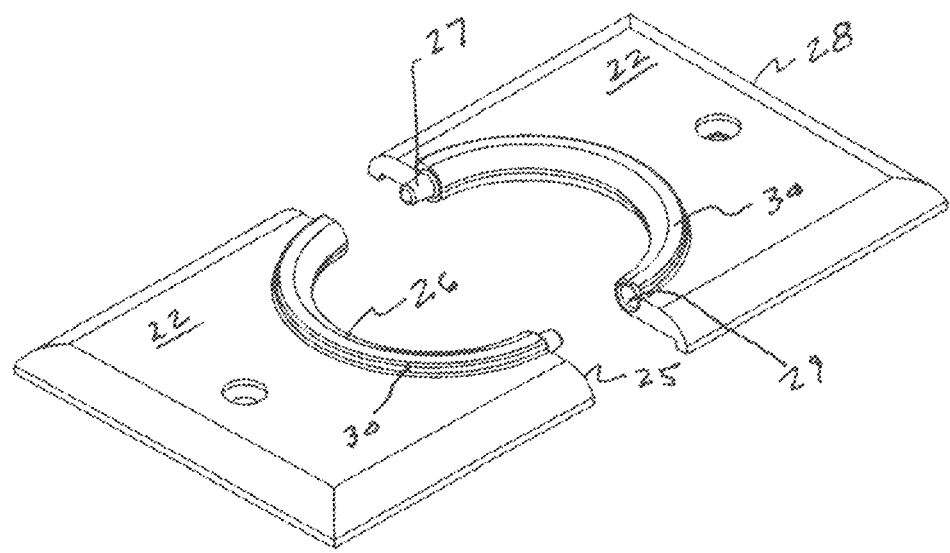
FIG. 12 is a top perspective view of two plate sections.
Figure 13:
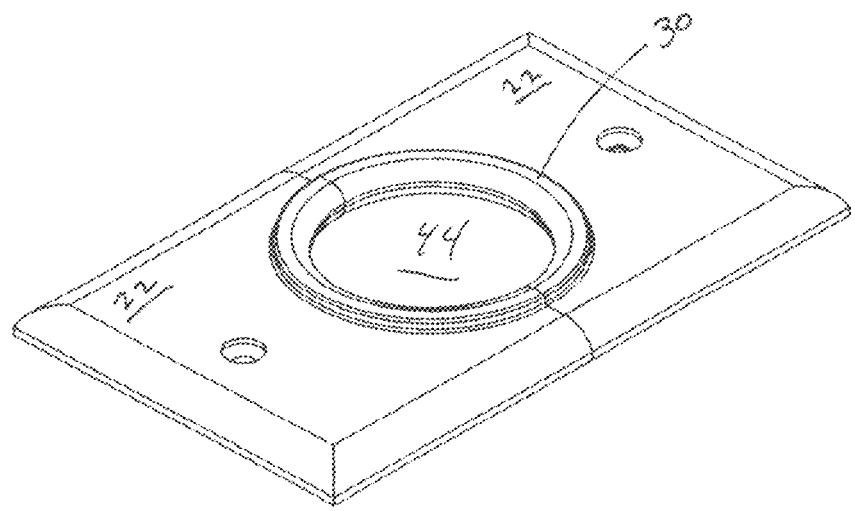
FIG. 13 is a top perspective view of two joined plate sections.

With reference to FIGS. 12-13, each plate section 22 includes a mating end 25 including a semicircular cutout 26, an outer end 28, and a bead 30 extending around the periphery of the semicircular cutout 26. A post 27 extends from one end of the bead 30 at the mating end 25 of the plate section a bore 29 is formed in the opposite end of the bead. The plate sections include one or more apertures 31 to facilitate connection to a low voltage plate.

Referring to FIGS. 9-11B, each reducer 24 is substantially semicircular in shape and includes two ends 32 each having a substantially planar mating surfaces 34. The reducer 24 includes a post 36 extending from one end 32 and a receiving bore 38 in the opposing end. Two wings 40 form a U-shaped channel 42 on the outer periphery of the reducer 24. In assembling the LV pass-thru plate 20, inner surfaces 45 on the wings 40 on the outer periphery of the reducer will function to mate with the surface of the bead 30 (see FIG. 12) of each plate section 22.

Figure 8:
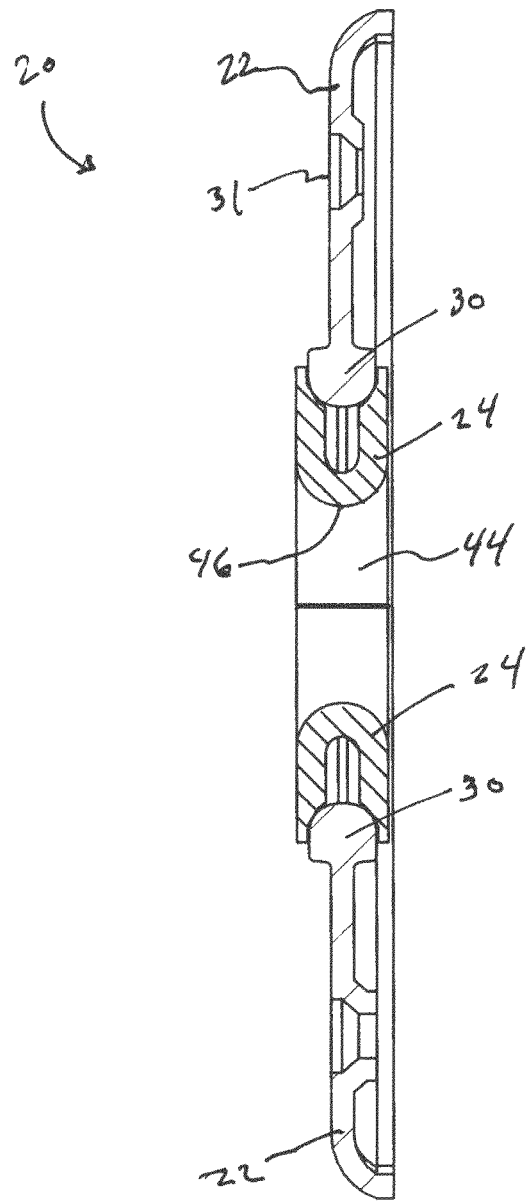
FIG. 8 is a sectional view of the single-gang LV pass-thru plate assembly taken along line 8-8 of FIG. 5.
Figure 9:
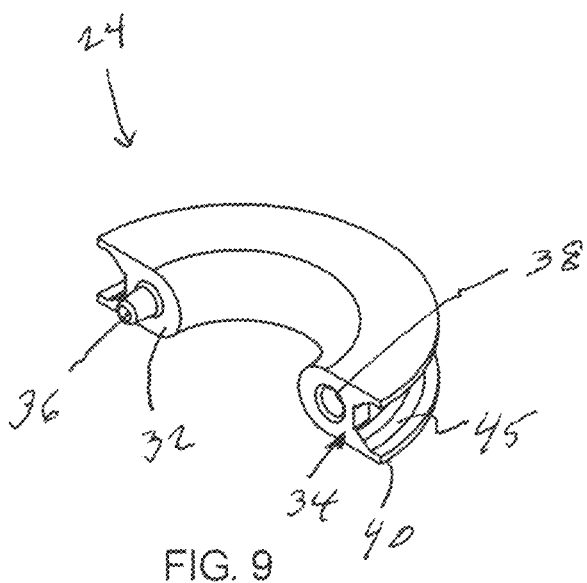
FIG. 9 is a perspective view of the first embodiment of a reducer that forms a portion of the LV pass-thru plate assembly.
Figure 10:
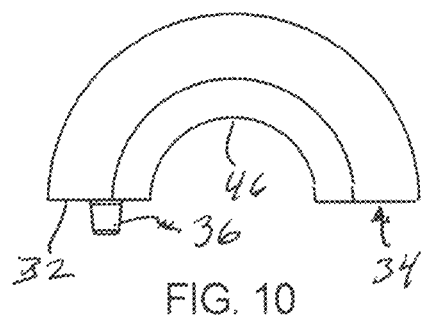
FIG. 10 is a plan view of a reducer section according to the invention.
Figure 11:
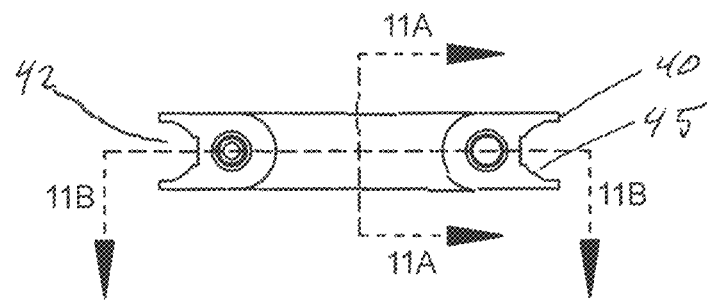
FIG. 11 is an end view of the reducer as viewed from the bottom of FIG. 10.
Figure 11A:
FIG. 11A is a sectional view of the reducer taken along line 11A-11A of FIG. 11.
Figure 11B:
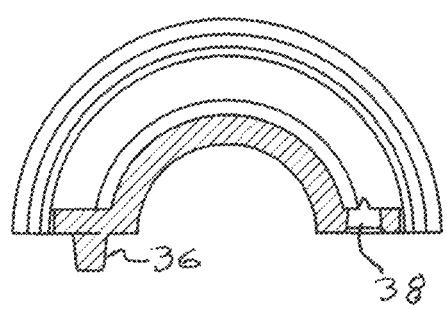
FIG. 11B is a sectional view of the reducer taken along line 11B-11B of FIG. 11.

With reference to FIG. 8, the assembled LV pass-thru plate 20 includes two plate sections 22 and the assembled reducer 24. The mating ends 25 of the plate sections form an opening 44 in the joined plates. The opening 44 is bounded by the rounded inner surface 46 of the assembled reducer 24 to create a gentle bend radius for any cables or cable bundles that are later inserted through the assembled LV pass-thru plate 20.

With reference to FIGS. 1 and 2, the reducer 24 is held within the opening 44 by a frictional fit between the posts 27 in one plate section and the bores 29 in the opposing plate section and further by a frictional fit between the posts 36 in one reducer 24 and the bores 38 in the opposing reducer.

Figure 14:
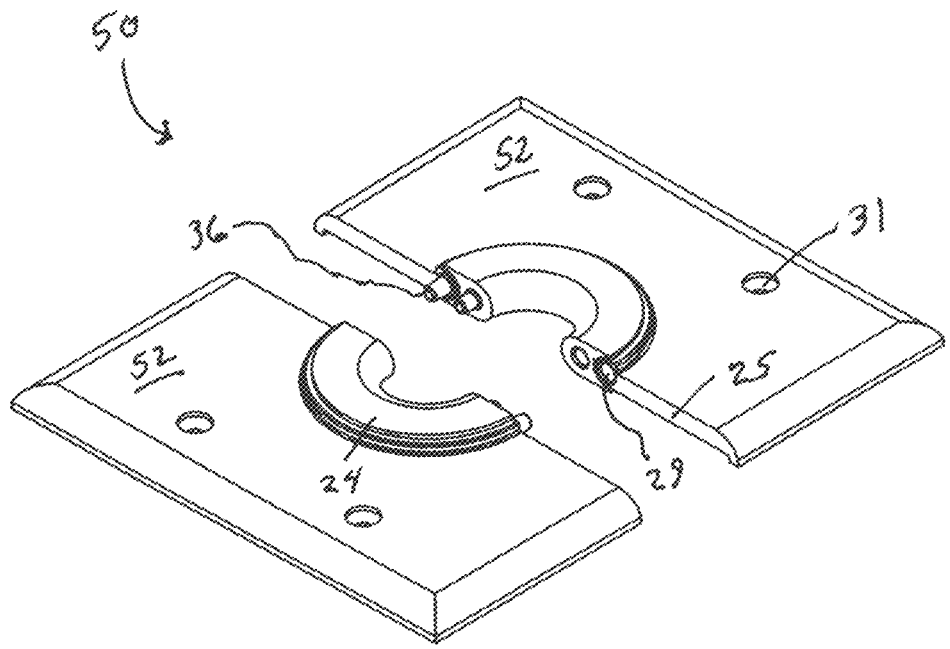
FIG. 14 is a top perspective view of two two-gang plate and reducer assemblies in alignment to form an LV pass-thru plate according to the present invention.
Figure 15:
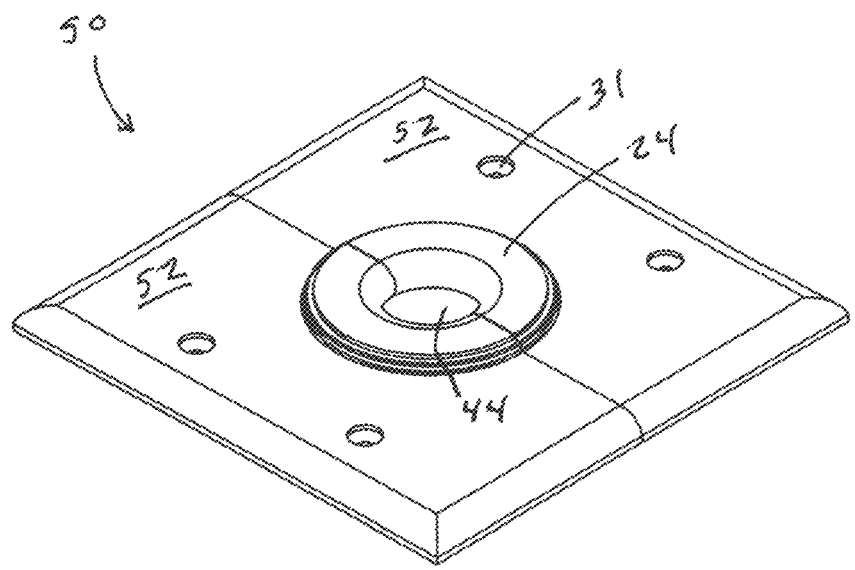
FIG. 15 is a top perspective view of a two-gang LV pass-thru plate assembly according to the present invention.

Referring to FIGS. 14 and 15, a second embodiment of the low voltage pass-thru plate is a two-gang LV pass-thru plate 50 that includes two reducers 24 sandwiched between two plate sections 52.

Figure 16:
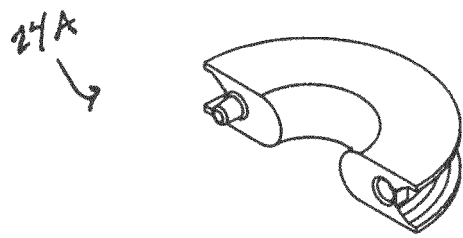
FIG. 16 is a perspective view of the first embodiment of the single-gang reducer that forms a portion of the single-gang LV pass-thru plate assembly.
Figure 17:
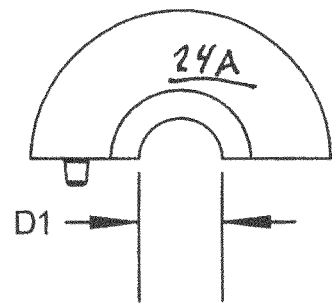
FIG. 17 is a plan view of the first embodiment of the single-gang reducer.
Figure 18:
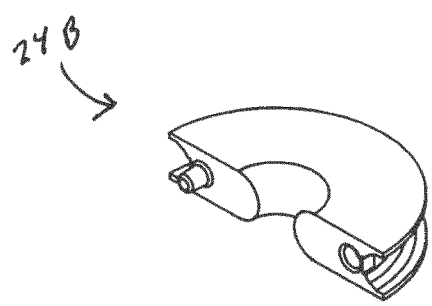
FIG. 18 is a is a perspective view of a second embodiment of a single-gang reducer that forms a portion of the LV pass-thru plate assembly.
Figure 19:
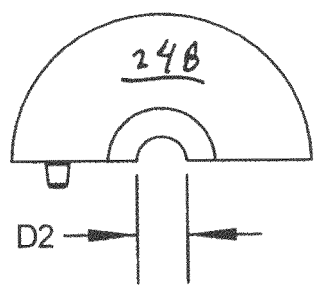
FIG. 19 is a is a plan view of the second embodiment of the single-gang reducer.
Figure 20:
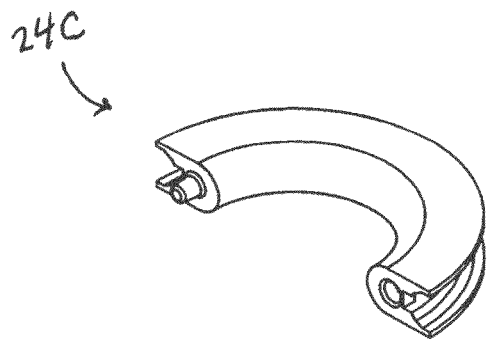
FIG. 20 is a is a perspective view of a third embodiment of a single-gang reducer that forms a portion of the LV pass-thru plate assembly.
Figure 21:
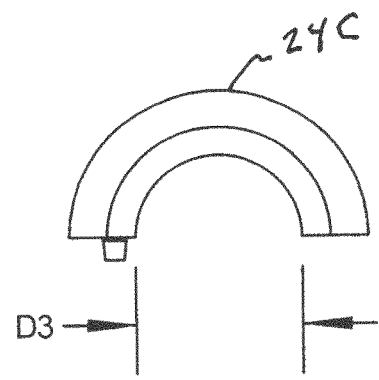
FIG. 21 is a is a plan view of the third embodiment of the single-gang reducer.

With reference to FIGS. 16-21, there are shown various embodiments of a reducer 24 according to the invention. As shown in FIGS. 16 and 17, the first embodiment of the reducer 24A, when assembled with another reducer 24A, will form an opening of a first diameter D1. As shown in FIGS. 18 and 19, the second embodiment of the reducer 24B, when assembled with another reducer 24B, will include an opening of a second diameter D2, and as shown in FIGS. 20 and 21, the third embodiment of the reducer 24C, when assembled with another reducer 24C, will include an opening of a third diameter D3. Most preferably the diameter of the reducers would include 0.5-inch for reducer 24A (D1), 0.312-inch for reducer 24B (D2, and 0.75-inch for reducer 24C (D3). It is within the scope of the invention that reducers having openings of other diameters could also be supplied with the kit for a low voltage pass-through plate of the present invention.

Figure 22:
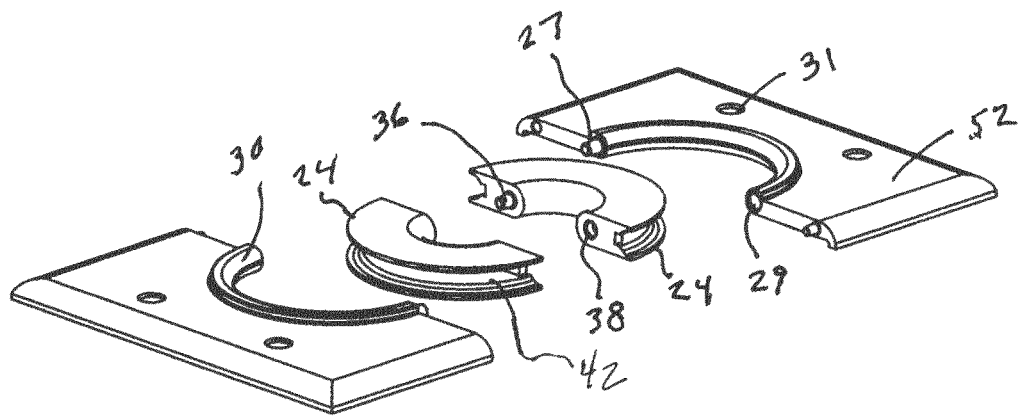
FIG. 22 is an exploded perspective view of two two-gang plate sections in alignment with two reducers.
Figure 23:
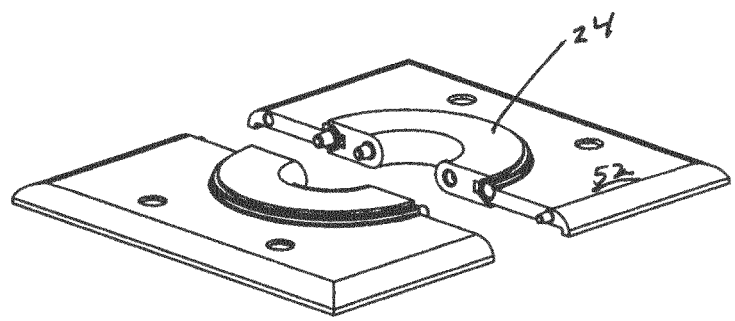
FIG. 23 is a perspective view of the two-gang plate and reducer assemblies of FIG. 20 in alignment to be joined together.
Figure 24:
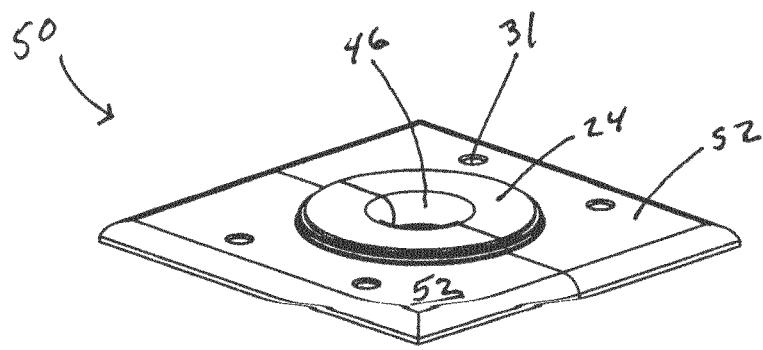
FIG. 24 is a perspective view of the fully assembled two-gang plate and reducer assembly.

Referring to FIGS. 22-24 illustrate one possible sequence of steps for assembling a two-gang low voltage pass-thru plate 50 according to the invention. As shown in FIG. 22, two two-gang LV pass-thru plates 52 are aligned with two reducers 24 with the mating surfaces 34 of the reducers facing each other. As shown in FIG. 23, the reducers 24 can be fitted to their respective plate sections 52. As shown in FIG. 24, a low voltage pass-through plate is formed by includes two reducers 24 sandwiched between two plate sections 52.

Figure 25:
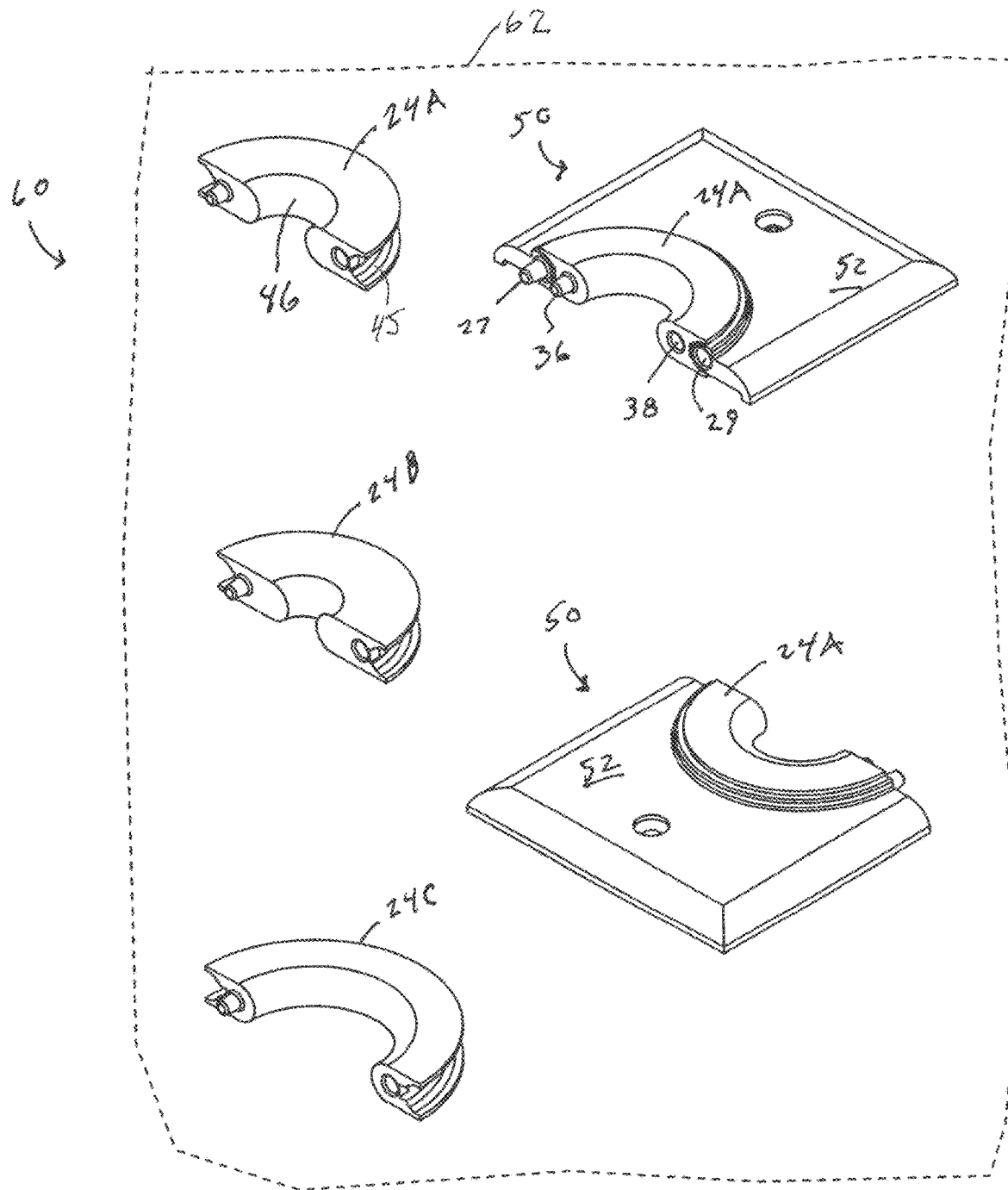
FIG. 25 is a perspective view of a kit for installing a low voltage pass-through plate to a low voltage bracket to provide an opening for passage of low voltage cables through a wall surface.

With reference to FIG. 25, a kit 60 for installing a low voltage pass-through plate 50 to a low voltage bracket preferably includes at least two plate sections 52 and at least two reducers to enable an installer to assemble a low voltage pass-thru plate 50 to meet the installer's requirements at the job site. Most preferably, the kit 60 would include at least three reducers 24A, 24B, or 24C to enable the installer to configure the pass-thru plate as desired to meet the requirements at the job site. Reference number 62 denotes packaging material, which could be any conventional material, such as a plastic bag or a box.

Although the description above contains many specific descriptions, materials, and dimensions, these should not be construed as limiting the scope of the invention but as merely providing illustrations of some of the presently preferred embodiments of this invention.

I claim:

1. A kit for a low voltage pass-through plate, comprising:
   two plate sections;
   a reducer including two or more reducer sections;
   a planar mating end on said plate sections;
   a cutout on said planar mating end of said plate sections, said cutout having a periphery;
   a bead extending around the periphery of the cutout of said plate sections; and
   a U-shaped channel on said reducer sections, said U-shaped channel of a complimentary shape to accept a flush fit onto said bead of said plate sections;
   a post on a first end of the bead of said plate sections and a bore on the opposite end of the bead;
   said reducer sections include two ends having planar mating surfaces;
   a post extending from a first end of said reducer sections;
   a receiving bore in a second end of said reducer sections;
   said U-shaped channel includes two wings on the outer periphery of the reducer sections; and an inner surface on the wings;
   said reducer sections including a rounded inner surface; and
   said rounded inner surface including a gentle bend radius.

2. The kit of claim 1 comprising:
   at least two plate sections and at least two reducers.

3. The kit of claim 1 comprising a packaging material enclosing said kit.

* * * * *